United States Patent [19]
Parish, II et al.

[11] Patent Number: 6,156,139
[45] Date of Patent: *Dec. 5, 2000

[54] AUTOMATED SIDEWALL FUSING APPARATUS

[75] Inventors: Robert Owen Parish, II, Cleveland, Tex.; Joseph G. Gho, Vancouver, Canada; Randall Jeff Kozak, Surrey, Canada; Garry Joseph Anderson, N. Vancouver, Canada

[73] Assignee: Global Utility Technologies Ltd., London, United Kingdom

[*] Notice: This patent is subject to a terminal disclaimer.

[21] Appl. No.: 09/344,065

[22] Filed: Jun. 25, 1999

Related U.S. Application Data

[63] Continuation of application No. 08/985,636, Dec. 5, 1997, Pat. No. 5,948,189.

[51] Int. Cl.[7] .......................... B32B 35/00; B29C 35/00; G05G 15/00; B29B 13/00; G01C 21/00

[52] U.S. Cl. .......... 156/64; 156/304.2; 156/358; 156/359; 156/363; 156/483; 156/499; 269/41; 269/77; 425/169; 701/213

[58] Field of Search .................. 156/64, 293, 296, 156/304.2, 304.6, 499, 433, 358, 359, 360, 363, 538; 269/37, 41, 56, 58, 77, 85; 228/212, 213; 425/517, 169, 170, 171; 701/213

[56] References Cited

U.S. PATENT DOCUMENTS

| | | | |
|---|---|---|---|
| 5,013,376 | 5/1991 | McElroy, II et al. | 156/64 |
| 5,814,182 | 9/1998 | McElroy, II et al. | 156/338 |
| 5,948,189 | 9/1999 | Parish, II et al. | 156/64 |

*Primary Examiner*—Richard Crispino
*Assistant Examiner*—J. A. Lorengo
*Attorney, Agent, or Firm*—Mary J. Gaskin

[57] ABSTRACT

The present invention is directed to a method and apparatus for fusing a sidewall pipe onto a host pipe using pneumatic equipment. The functions of the fusing apparatus are controlled by a programmable computer.

7 Claims, 8 Drawing Sheets

AUTOMATED SIDEWALL FUSING APPARATUS

This is a continuation of application Ser. No. 08/985,636 filed on Dec. 5, 1997, now U.S. Pat. No. 5,948,189.

FIELD OF THE INVENTION

The present invention is directed to the field of fusing a polyolefin pipe onto a sidewall of another polyolefin pipe of equal or lesser diameter.

BACKGROUND OF THE INVENTION

The use of polyolefin pipe has become commonplace for utilities. Other industrial uses of polyolefin pipe have increased with the development of fusible polyolefin materials. Fusible materials such as polyethylene and polyethylene alloys are being substituted for steel, ductile iron, clay, concrete, and bell and spigot PVC pipe for industrial uses in which high pressure and heat are not a concern. These polyolefin materials are typically lighter in weight and almost completely unaffected by corrosion. For example, polyolefin pipe is being used to transport corrosive chemicals, waste water, potable water, storm water, and for irrigation systems, leachate systems and petrochemical collection systems.

A number of circumstances will require fusing two pieces of polyolefin pipe together. The process of fusing polyolefin pipe consists of placing two matching surfaces on either side of a heat source, heating the surfaces to a predetermined temperature, removing the heat source, and forcing the two surfaces together under pressure.

Many factors affect the fusing of two pieces of polyolefin pipe. Polyolefin pipe is manufactured in many different wall thicknesses and diameters. In addition, fuses of the two pipes may be performed in a wide range of environments, from shops with controlled conditions to open pits subject to ground and weather conditions. An effective fusing apparatus would have to adapt to all such conditions. Further, depending on the result desired, the two pieces of pipe may be fused end to end (butt fusing) or with the end of one joined to the sidewall of the host pipe (sidewall fusing). Butt fusing is generally easier to accomplish. Sidewall fusing is accomplished by either of two methods: (1) fusing a fabricated saddle with a pipe nipple already attached onto the sidewall of the host pipe; or (2) fusing onto the host pipe a pipe with a concave radius on one end matching the convex radius of the host pipe.

Prior art devices accomplishing sidewall fusing are described in U.S. Pat. Nos. 3,998,682, 4,533,424, 4,542,892, and 5,613,807. Fusing machines currently being used employ manually-operated screws, hand-pumped hydraulics, auxiliary-powered, high pressure hydraulics, or a combination of these in order to provide the movements and pressures necessary to complete a sidewall fusion. Machines employing manually-operated screws or hand-pumped hydraulics are slow, preventing an operator from joining the heated surfaces together quickly after the heat source is removed. Auxiliary-powered, high-pressure hydraulic machines must have valves, hoses, and cylinders capable of operating at high pressures, making the machines heavy and expensive; additionally, replacement power units for such machines are not readily available at rental outlets and contractor supply houses.

U.S. Pat. No. 5,013,376 discloses and claims a method of heat fusing which uses hydraulics and is controlled by a programmable computer. The patent states generally that the apparatus can be used for sidewall fusing; however, the apparatus described would be unable to perform sidewall fusions. For instance, the apparatus has no way of moving and attaching sidewall pipe (all movements described are along a longitudinal axis). No provision is made for fusing two different sizes of pipe, which would call for different soak times. Sidewall fusing requires a special heating plate with concave and convex faces. Also, the apparatus described uses a facing tool (useless in sidewall fusing) but has no provision for making radius cuts.

SUMMARY OF THE INVENTION

The present invention is directed to the use of automated, pneumatic fusing equipment to fuse a piece of polyolefin pipe to the sidewall of another polyolefin pipe. The functions of the fusing equipment are controlled by a programmable computer. The operator of the machine selects options from a menu on a control panel, which is programmed to account for different pipe sizes and environmental conditions. In addition to controlling the pneumatically-operated functions, the computer records the date, time, size, and status (pass or fail) of the fuse. All this information may be stored and uploaded. Further, each time a fuse is performed, the computer automatically activates an onboard Global Positioning System (GPS) in order to provide the geographical location of the fuse. Uploading the GPS location to a computerized map results in a permanent geographical record of the fuse.

The invention consists of a base, extension rods, travel head, and control panel. The base accommodates the pneumatically-activated pipe clamps and pneumatic valves for attaching the base to the host pipe; it also provides an attachment for the heating plate and the pneumatic cylinders that actuate the heating plate, as well as an attachment for the two guide rods on which the travel head slides. The travel head moves along the extendible guide rods; the distance traveled is the length of the pipe being fused onto the sidewall of the host pipe. The travel head provides the points of attachment for the pneumatic cylinders that raise and lower the stack (sidewall pipe), for the extension rod pneumatic clamps that secure the travel head as it automatically adjusts for the length of the stack, for the bladder that inflates to provide attachment to the stack, and for the pneumatic travel head controls. The control panel, which is attached to the fusing machine by means of electric control cables, monitors the fusing machine and controls the pneumatic functions.

The use of pneumatics (air) to carry out the fusing process has no precedent in the prior art. Prior art has depended on high-pressure hydraulics to perform fusing operations. However, in the present invention, pneumatics are used to raise and lower the heating element and the sidewall pipe, to inflate the bladder, and to check the fuse. The advantages of pneumatics over hydraulics are numerous: air components are lighter, cheaper, more widely available, and more responsive. The pneumatically-actuated system of this invention is effective due to the use of additional heating time and to the application of pressure to the heating plate during the main heating cycle, which forces the surface of the host pipe to conform to a true matching heating plate surface. Because pneumatics are used rather than hydraulics, the sidewall pipe can be heated and fused to the host pipe before much heat is dissipated, resulting in a strong fuse.

The primary object of this invention is to overcome the limitations of the prior art by providing a fusing apparatus which is completely automated, pneumatically-powered, lightweight, and operator-friendly.

A further object of this invention is to provide a portable fusing apparatus which can be moved, set up, and removed without mechanical assistance. The apparatus can be hand carried on the job site, lowered by hand into a pit, removed by hand from a pit, and moved by hand from fuse to fuse.

Another object of the invention is to provide a computer-controlled pneumatic fusing apparatus which has production line capabilities utilizing one computer and one power source to control one or more fusing machines., A still further object of this invention is to apply sequential pressure during fusing, resulting in better pipe conformation, which yields successful fusing using less pressure.

Another object of the invention is to provide a method which allows two pipe surfaces to be fused, with minimal time elapsing between heating and fusing.

Yet another object of the invention is to provide an apparatus which can adjust soak time during preheating of the pipes to be fused.

DESCRIPTION OF THE PREFERRED EMBODIMENT

Figure 1:
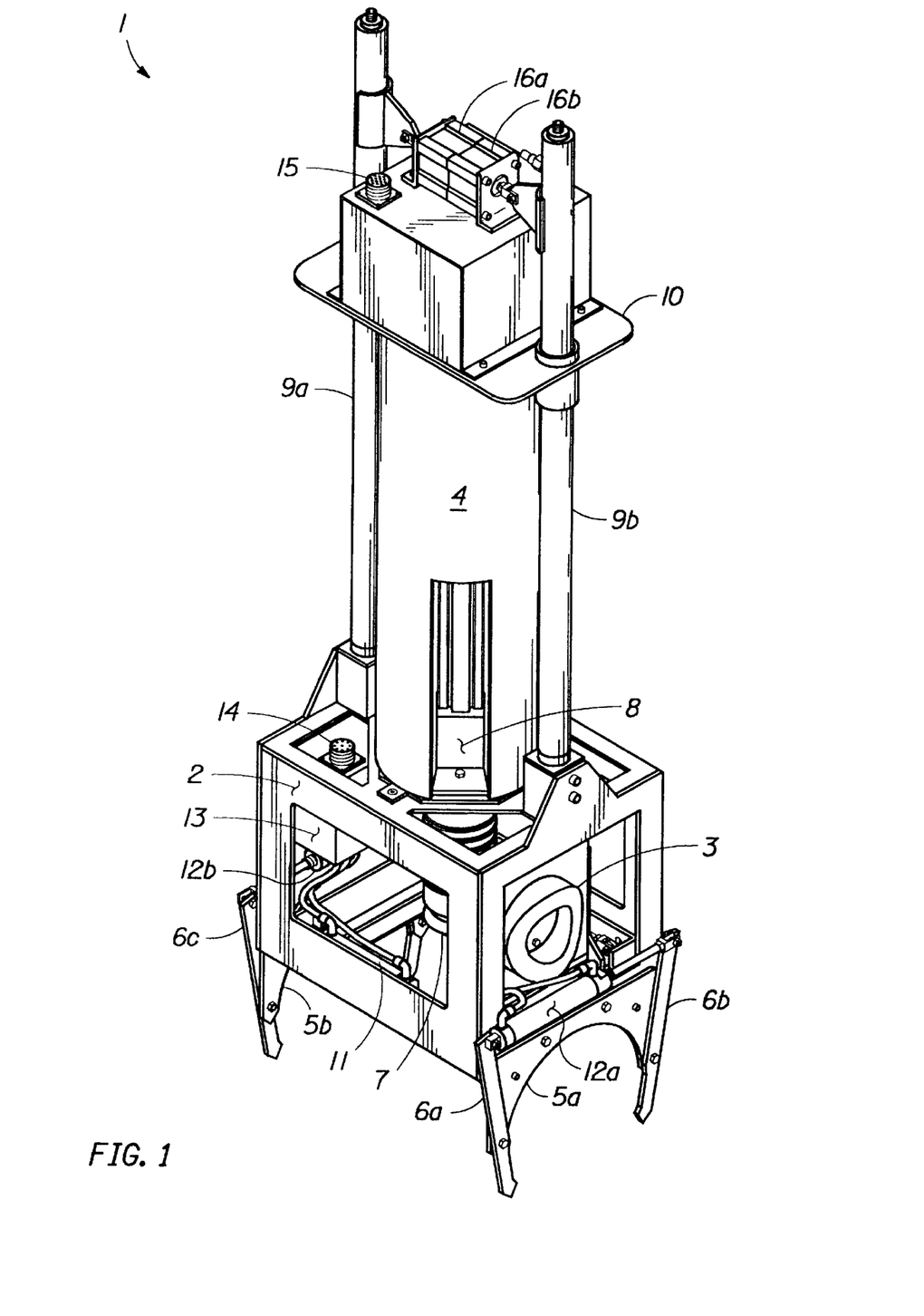
FIG. 1 is a side perspective view of the fusing machine of the present invention.

Referring to FIG. 1, the preferred fusing machine of the present invention is shown. The fusing machine 1, constructed primarily of stainless steel and aluminum, includes a base 2, a hinged heating plate 3 of Teflon-coated aluminum, a stack housing 4, radius plates 5a and 5b disposed one on each side of the base 1, movable pipe clamping arms 6a, 6b, 6c, (6d hidden), a bladder 7, a bladder plate 8, extension rods 9a, 9b, and a travel head 10. Heating plate pneumatic cylinders 11, one on each side of the heating plate 3, control the movement of the heating plate 3. Pipe clamping pneumatic cylinders 12a, 12b facilitate clamping the fusing machine 1 to the host pipe.

Attached to the base 2 is a base control box 13 for housing pneumatic and electrical connections and solenoids. Information from the control panel 30 (shown in FIG. 4) is transmitted through the base electrical control connection 14. Information from the control panel 30 is received at travel head electrical control connection 15, controlling vertical movement of the travel head 10 along the extension rods 9a, 9b. Rod clamping cylinders 16a, 16b lock the travel head 10 in place.

Figure 2:
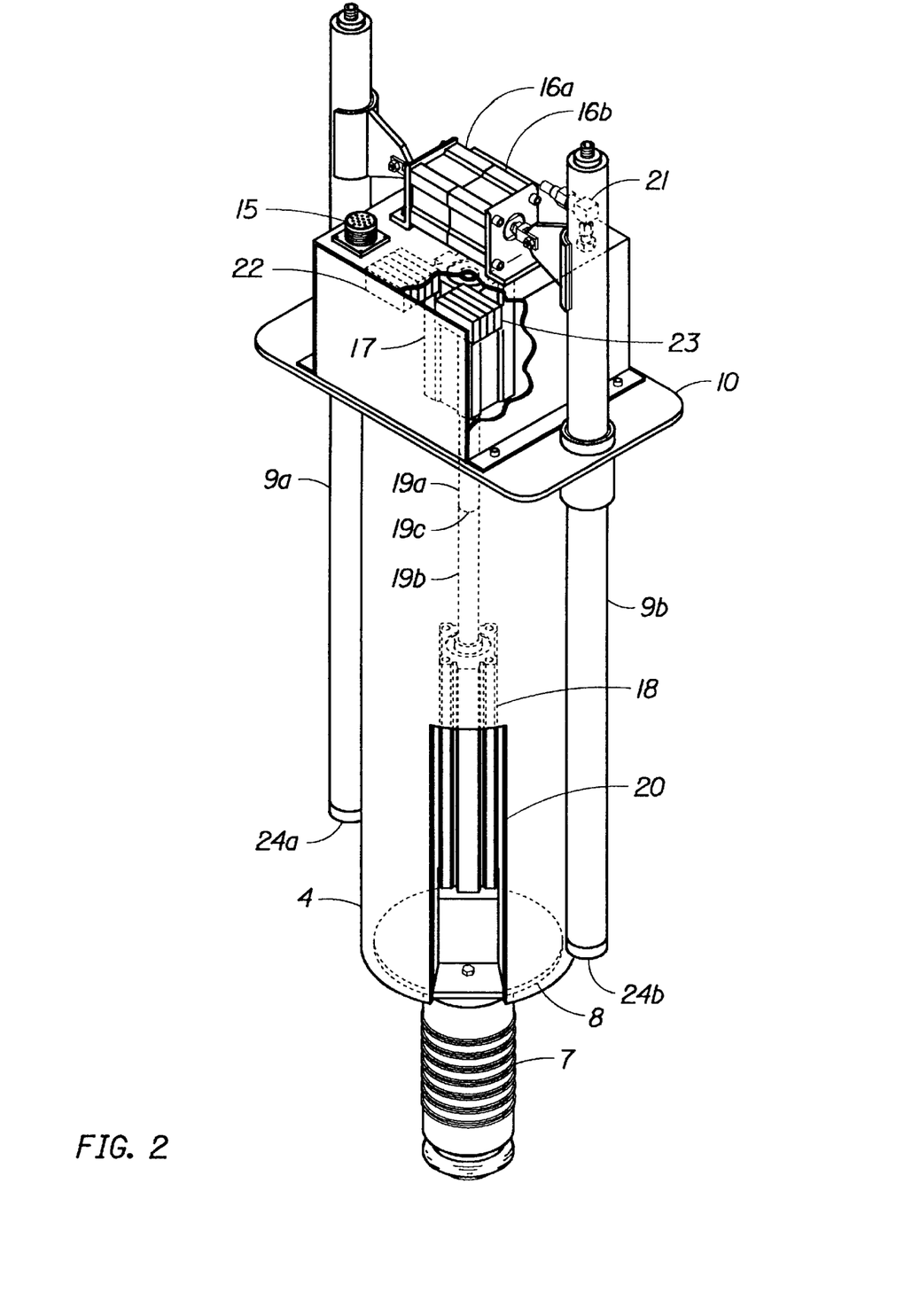
FIG. 2 is a side perspective view of the travel head portion of the fusing machine, showing parts of the travel head interior in cutaway.

FIG. 2 shows fusing pneumatic cylinder 17 disposed within the travel head 10. Stack loading cylinder 18 is disposed within stack housing 4. Cylinder rods 19a, 19b between cylinders 17 and 18 are coupled together at 19c. At the lower end of stack loading cylinder 18 is a bladder plate 8, and below that the bladder 7, an inflatable rubber plug. A notch 20 prevents stack loading cylinder 18 from allowing the stack to rotate. Air is supplied to the fusing pneumatic cylinder 17 through travel head air connection 21. Electrically-activated air regulators 22 and solenoids 23 control all functions of travel head 10. The travel head 10 is connected to base 2 at extension rod ends 24a, 24b.

Figure 3:
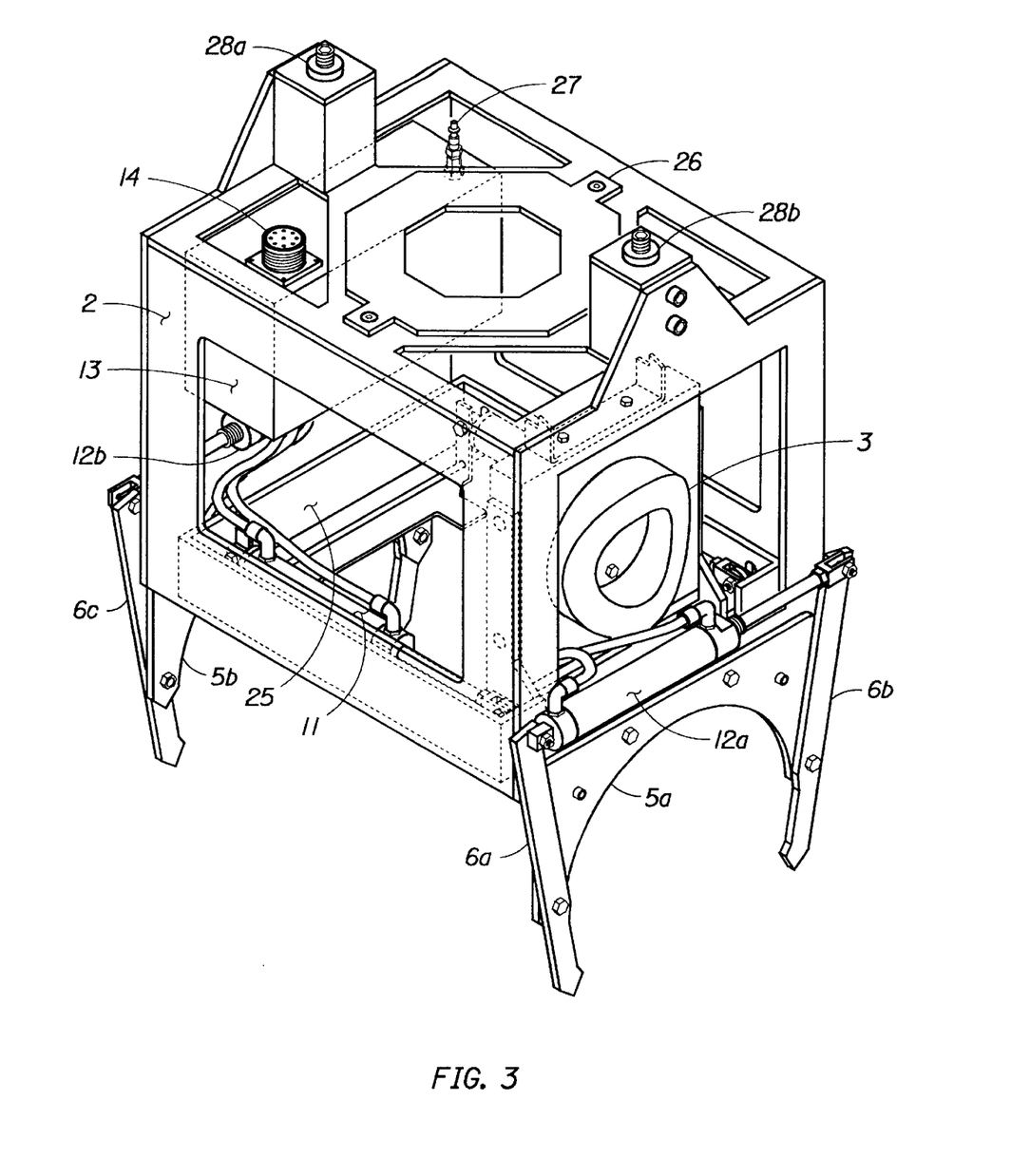
FIG. 3 is a side perspective view of the base of the fusing machine, showing parts of the interior of the base in cutaway.

FIG. 3 shows only the base 2 of the fusing machine 1. The heating plate 3 is in a raised position. In operation, it is lowered against a self-leveling, floating heating plate frame 25. The stack centering plate 26 keeps the stack in proper alignment to the host pipe. Air is supplied to heating plate pneumatic cylinders 11 and pipe clamping pneumatic cylinders 12a, 12b through base air connection 27. Extension rod connection ends 24a, 24b are threaded onto base connectors 28a, 28b.

Figure 4:
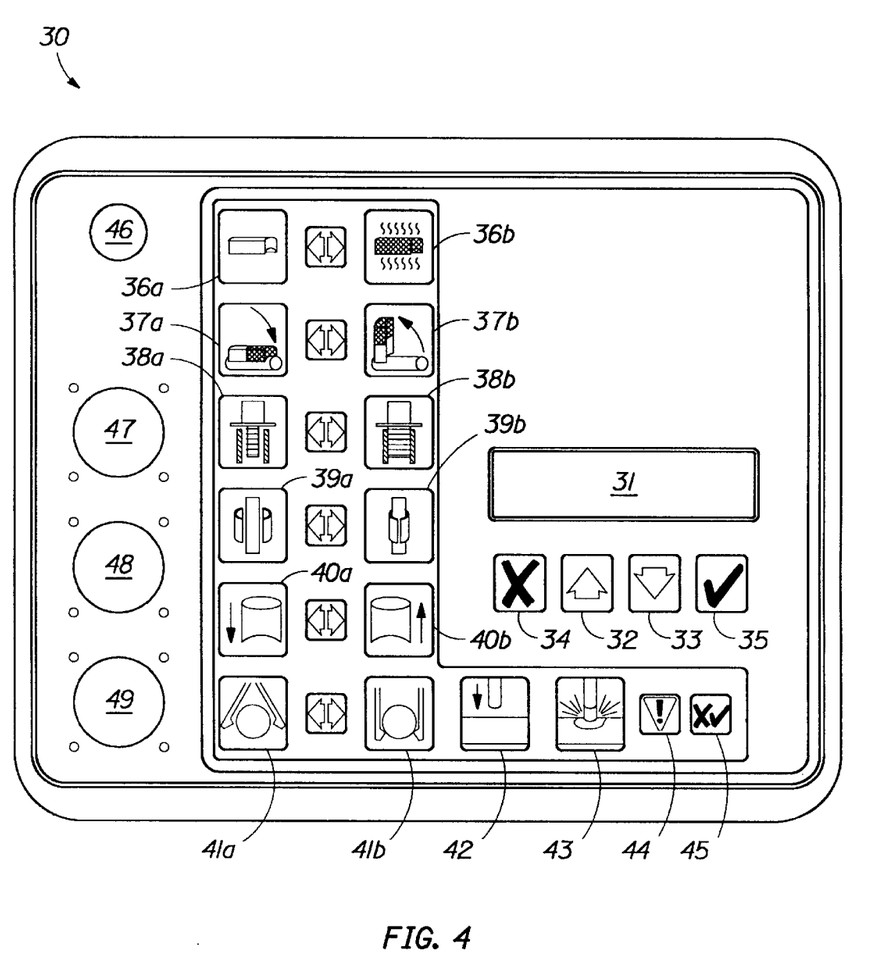
FIG. 4 is a top view of the control panel of the present invention.

FIG. 4 shows the control panel 30 which controls the automatic operation of the fusing machine 1. The control panel 30 is constructed of high-impact plastic, with water resistant housing. The controls are membrane switches. The control panel 30 has a menu display screen 31. Down arrow key 32 allows the operator to scroll down, while up arrow key 33 allows the operator to scroll up through menu choices. X-key 34 allows the operator to reject a choice, while ✓-key 35 allows an operator to accept a choice. Heating plate switch 36a turns the heating plate 3 off, while heating plate switch 36b turns it on. Heating plate cylinder control 37a causes the heating plate 3 to be lowered, while heating plate cylinder control 37b causes it to return to a raised position. The bladder control 38a causes the bladder 7 to deflate, while the bladder control 38b causes it to inflate. The travel head rod clamping cylinder control 39a releases the travel head 10, while the travel head rod clamping cylinder control 39b extends and locks the travel head 10. Stack control 40a lowers the stack, while stack control 40b raises the stack. Pipe clamping arms control 41a releases the base 2 from the host pipe, while pipe clamping arms control 41b clamps the base to the host pipe. Auto setup control 42 actuates the automatic set up functions. Auto fuse control 43 actuates the fusing operation. The interrupt indicator 44 will light up if either a power failure or a heating plate 3 failure disrupts the fusing process. Fuse pass/fail indicator 45 indicates whether the resulting fuse has been accomplished.

The control panel 30 is connected to its power supply at power supply receptacle 46. Computer interface 47 receives the cable which allows the control panel 30 to transmit and receive information. Electrical cables are connected to the control panel 30 at travel head cable connector 48 and base cable connector 49.

Before operating the fusing machine 1 can be operated, a 110 volt electrical supply is connected to the control panel 30 at power supply receptacle 46. Electrical cables connect the control panel 30 to the fusing machine 1; one runs between travel head cable connection 48 and the travel head electrical control connection 15, the other between the base cable connector 49 and the base electrical control connection 14.

Prior to fusing, the surface of the polyolefin host pipe must be free of all contaminants. New pipe may be cleaned by rubbing the area to be fused with 60 grit emery cloth or with alcohol. Pulled pipe (pipe pulled through the ground or along street surfaces) may have scratches, gouges and nicks, which can be cleaned by high pressure laser-jet washing or by using a brush and alcohol.

The polyolefin sidewall pipe (called a stack) to be fused onto the host pipe must also be prepared. One end of the stack is cut to conform to the curvature of the outer surface (convex radius) of the host pipe. The stack radius cut is roughened with a medium rasp, then cleaned as described for the host pipe.

The automated fusing method of this invention utilizes software which sets time sequences controlling the operation of the compressed air solenoids, the actuating sequences of the solenoids, the parameters of the air test, the pass or fail specifications for the fuse, the temperature parameters.

FIGS. 5 through 13 show the sequence of steps involved in the fusing process, in a very simplified fashion.

Figure 5:
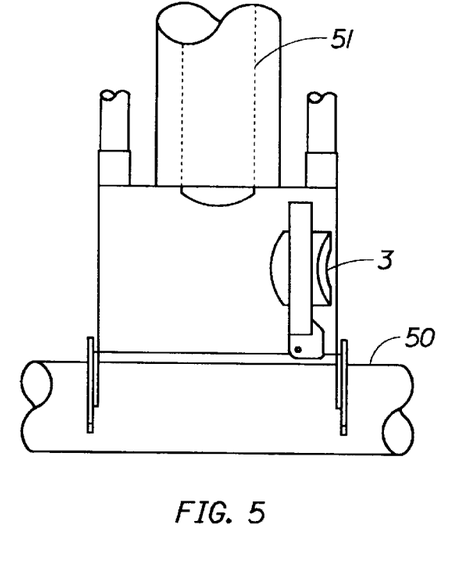
FIGS. 5 through 13 are simplified side views of the sequence of steps involved in the fusing process of the present invention. The fusing machine is shown clamped onto the host pipe, with the stack (sidewall pipe) installed in the fusing machine.

FIG. 5 shows the fusing machine 1 clamped to a host pipe 50. The stack (sidewall pipe) 51 is raised, as is the heating plate 3.

Figure 6:
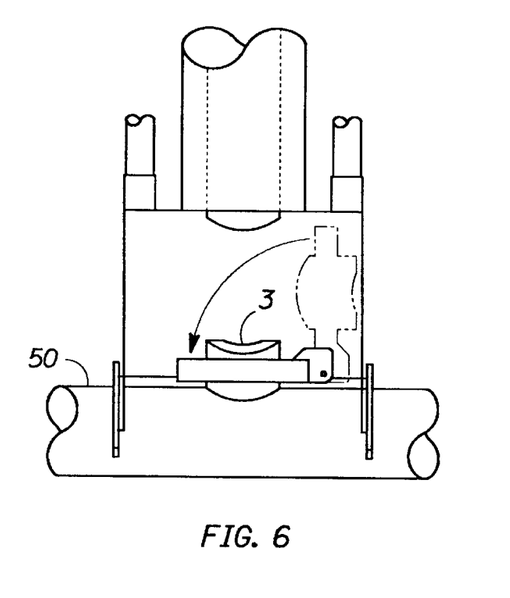

FIG. 6 shows the heating plate 3 in a lowered position, where it is heating a section of the host pipe 50. This is the beginning of the pre-heat cycle.

Figure 7:
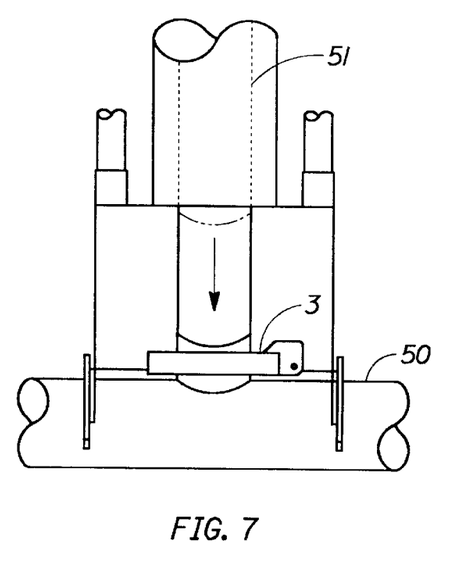

FIG. 7 shows the stack 51 lowered onto the heating plate 3 in order to seat the heating plate 3.

Figure 8:
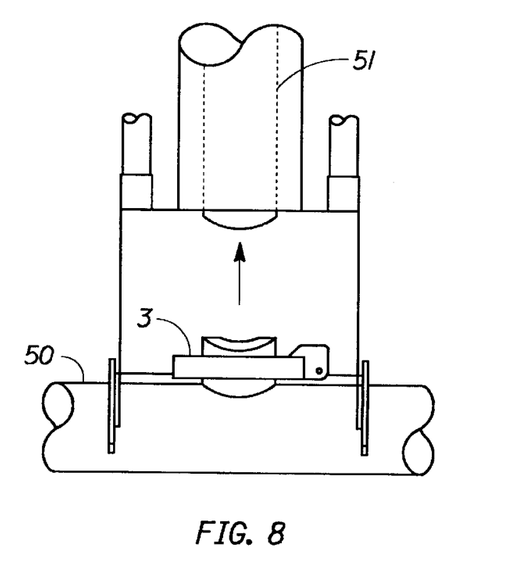

FIG. 8 shows the stack 51 raised away from the heating plate 3 to prevent the stack 51 from being prematurely heated.

Figure 9:
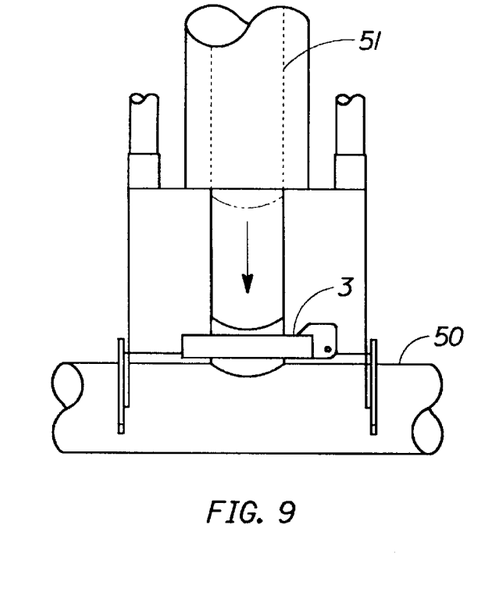

FIG. 9 shows the stack 51 lowered onto the heating plate 3 in order to seat the heating plate 3 under pressure.

Figure 10:
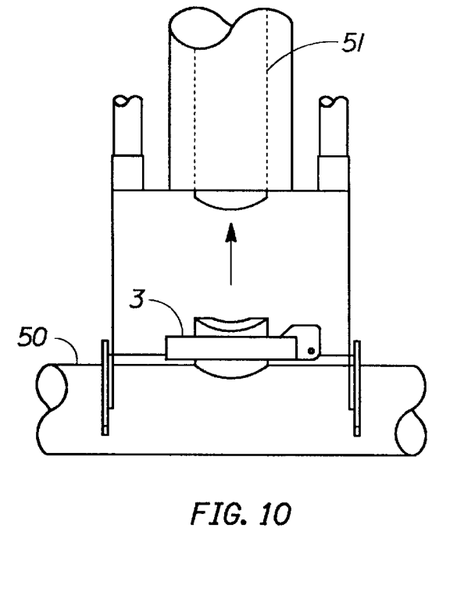

FIG. 10 shows the stack 51 raised away from the heating plate 3.

Figure 11:
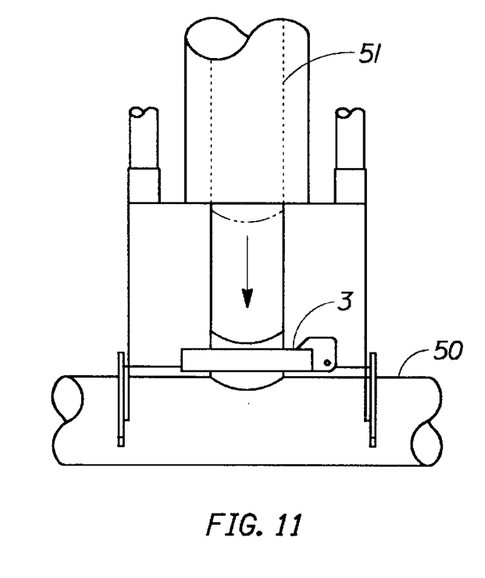

FIG. 11 shows the stack 51 lowered onto the heating plate 3 for a pre-programmed timed heat. The stack 51 is under pressure to assure the heating plate 3 is concentric with the host pipe 50 and stack 51.

Figure 12:
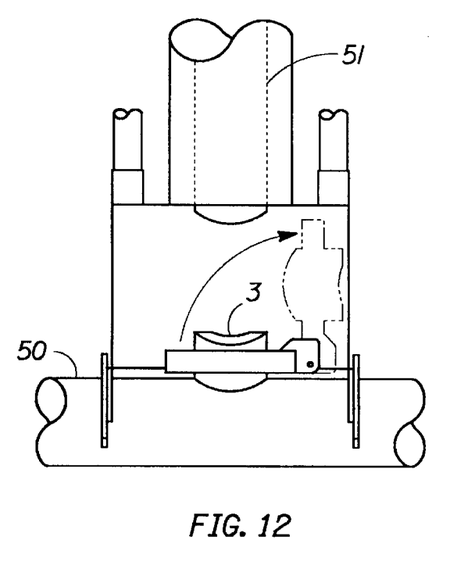

FIG. 12 shows the stack 51 after it has been raised and the heating plate 3 being returned to a raised position.

Figure 13:
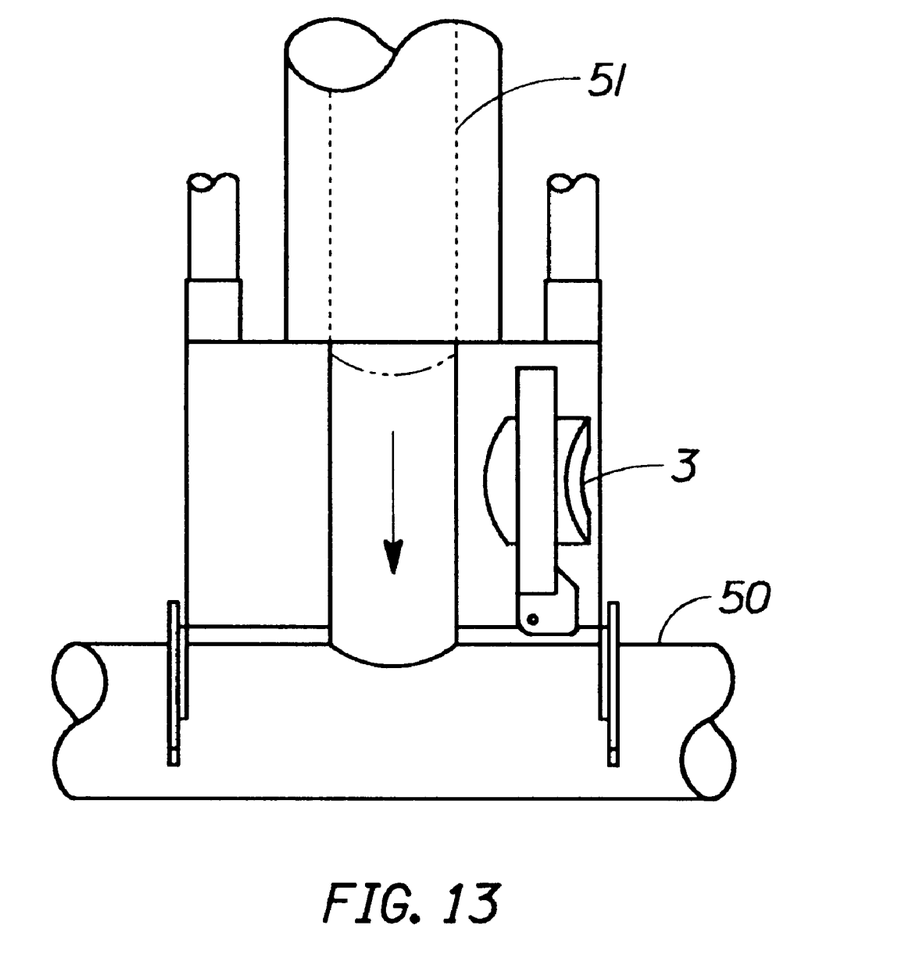

FIG. 13 shows the stack 51 lowered onto the heated section of the host pipe 50, to which it is fused. The pipes are left undisturbed in this position to allow the fuse to cool before the pressure test is performed.

Figure 14:
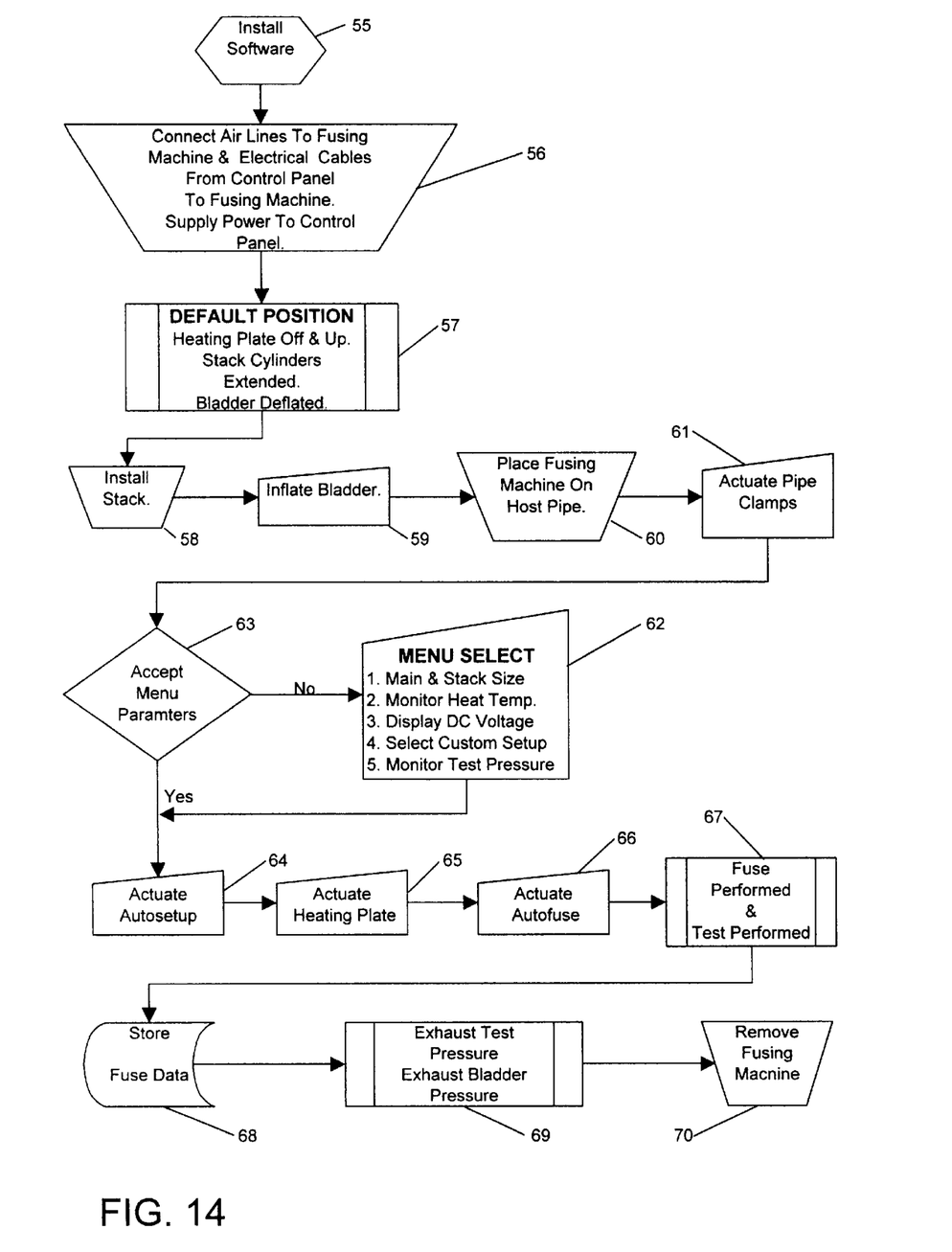
FIG. 14 is a flow chart showing the necessary manual and automatic operations involved in the fusing process of the present invention.

FIG. 14 shows the sequence of operations for completing a fuse, combining the necessary manual and automatic operations in a flow chart. As shown in FIG. 14, an operator will install software 55, which controls the operation of the control panel 30 during each fusing operation.[1]

[1] In order to make program changes to the control panel, power must be supplied to the control panel and an external computer connected to it. Software can be used to change the various automated sequences.

As shown in block 56, an attendant connects ⅛ air lines with 100 psi to the travel head air connection 21 and to the base air connection 27. He uses two electrical lines to connect the control panel 30 to the fusing machine 1, and a 110 volt power source is connected to the control panel 30.

When the power is turned on, the fusing machine 1 is in the default position 57, with the heating plate 3 turned off and in the raised position, the pipe clamping pneumatic cylinders 12a, 12b off, all the cylinders extended, the bladder 7 deflated, and the fusing machine 1 in the raised position.

The stack (sidewall pipe) 51 is manually installed 58 in the fusing machine 1 between the bladder 7 and the top plate of the base 2, and inside the stack centering plate 26. The concave radius of the stack 51 is situated in axial alignment with the convex radius on the host pipe 50. The travel head 10 is lowered until the bladder 7 slides in the stack 51, then the bladder 7 is inflated 59. Upon activation, the travel head rod clamping cylinders 16a, 16b hold the travel head 10 in place.

As shown in block 61, the operator lowers the fusing machine 1 onto the host pipe 50 and activates the pipe clamping arms 6a, 6b, 6c (6d) to secure the fusing machine 1 onto the host pipe 50. (When fusing short stacks in a shop situation, the fusing machine can be attached to the host pipe before installation of the stacks.)

The operator checks the default menu display screen 31 on the control panel 30 to determine the current settings for pipe sizes, etc. The operator can scroll through the menu select 62 to choose the proper sizes for the host pipe 50 and stack 51, and to choose a custom set-up, which takes into account different weather and environmental conditions. The menu also allows the operator to monitor the test pressure and check the DC voltage of the control panel 30, as well as the temperature of the heating plate 3. In addition, it displays the date and time.

Upon accepting the menu parameters 63, the operator, as shown in block 64, chooses the control panel display function "Auto Seat on Main," selects "yes", and actuates the automatic set-up (auto setup control 42). The stack loading cylinder 18 automatically extends, forcing the stack 51 onto the host pipe 50. The bladder 7 deflates, allowing the stack 51 radius to seat on the host pipe 50 radius. The rod clamping cylinders 16a, 16b retract. The bladder 7 inflates, holding the stack 51 in place. The travel head 10 moves upward the combined length of the stack 51 and stack loading cylinder 18. The rod clamping cylinders 16a, 16b extend, locking the travel head 10 in place. The stack loading cylinder 18 retracts, causing the stack 51 to move upward, giving the heating plate 3 clearance to be lowered onto the host pipe 50. The heating plate pneumatic cylinders 11 extend, and the heating plate 3 lowers onto the host pipe 50. Stack loading cylinder 18 extends, lowering the stack 51 to the extended length of stack loading cylinder 18. The travel head rod clamping cylinders 16a, 16b release, dropping the travel head 10 and stack 51 approximately one inch until the stack makes contact with the heating plate 3. The travel head rod clamping cylinders 16a, 16b extend, locking the travel head 10 in place. Stack loading cylinder 18 retracts, raising the stack 51. The heating plate 3 is raised away from the host pipe 51.

Next, the heating plate 3 is actuated 65. Typically, the heating plate 3 requires twenty minutes to reach fusing temperature. (When the fusing machine 1 is being used in a shop situation, the heating plate 3 can be activated as soon as the power is turned on; however, when the fusing machine 1 is being used in a pit or augured hole, requiring moving and lowering the fusing machine 1, the heating plate 3 should be activated after the fusing machine 3 is attached to the host pipe 50.)

When the operator selects the Auto Fuse Control 43, he activates the automatic fusing functions 66. The timing and sequence of the air solenoids is controlled by the computer instructions in the control panel 30. The air pressure settings are controlled by air regulators 22 located on the fusing machine 1, which are activated by the control panel 30.

Selection of the auto fuse control 43 automatically stores the fuse and storing the information in volatile memory; this information can be uploaded later to create a permanent with time and date of the fuse, its status (pass or fail), as well as host pipe and stack size.

The control panel 30 monitors the temperature of the heating plate 3. When it reaches approximately 495° F., the automatic fusing sequence will commence[2]. At the beginning of the preheat cycle, the heating plate 3 is lowered onto the host pipe 50. At a timed interval, the stack 51 is lowered, under pressure, onto the heating plate 3 by the stack loading cylinder 18 for approximately five seconds. The stack 51 is then raised by stack loading cylinder 18. These steps may be repeated, depending on the diameter and SDR (standard dimension ratio) of the host pipe 50. This process facilitates the seating of the heating plate 3 on the host pipe 50 and ensures the ovality of the portion of the host pipe 50 which comes in contact with the heating plate 3. The preheat cycle lasts from two to four minutes.

[2] The fusing process is based on the availability of constant heat. In field conditions, with water present in the pits, water may come in contact with the heating plate 3, causing its temperature to drop below acceptable fusing temperatures. In that event, the control panel 30 will flash a yellow exclamation point on the interrupt indicator 44 and the system will abort the fuse.

During the main-heat cycle, the stack loading cylinder 18 extends, forcing the stack 51, onto the concave top side of the heating plate 3. Pressure is applied for a pre-programemd period of time to force the radius of the host pipe and the radius of the stack 51 to fully conform to the convex and concave radius of the heating plate 3. The pressure exerted by the stack loading cylinder 18 is isolated and exhausted. The stack 51 remains in contact with the heating plate 3, which is in contact with the host pipe 50 for a pre-programmed time to complete the main-heat. The stack loading cylinder 18 retracts, raising the stack 51, as the heating plate pneumatic cylinders 11 retract, raising the heating plate 3 away from the host pipe 50. The heating plate 3 automatically turns off. (This action takes place over a one-second period.)

The fusing pneumatic cylinder 17 and stack loading cylinder 18 extend, forcing the stack 51 under pressure onto the heated portion of the host pipe 50 under pressure for a pre-programmed period of time, resulting in the migration of the stack 51 into the host pipe 50. The pressure is reduced to zero. The fused stack 51 and host pipe 50 are now fused. The fuse is allowed to cool for a pre-programmed time, approximately six minutes.

To perform the fuse test 67, the control panel 30 actuates air solenoids 23, which causes an adjustable, regulated air pressure to be directed into the stack 51 through an access path in the bladder 7. The control panel 30 isolates the pressure source and monitors the pressure inside the stack 51 for a pre-programmed period of time at a pre-programmed pressure. Depending on the test parameters programmed into the on-board computer memory of the control panel 30 as compared to the monitored air pressure in the stack 51, the control panel 30 will display a pass or fail result on the menu display screen 31. In addition, a green "✓" or red "x" will flash on the fuse pass/fail indicator 45.

The fuse information is stored in the volatile memory 68, where the information can be uploaded subsequently to create a permanent record of the fuse.

The control panel 30 automatically releases the air test pressure in the stack 51. The bladder 7 is deflated, and the movable pipe clamping arms 6a, 6b, 6c, (6d) are released 69. The fusing machine 1 is then ready to be removed 70.

We claim:

1. A process for fusing a polyolefin stack pipe to the sidewall of a polyolefin main pipe using a computer and a fusing apparatus with a travel head and a base inside which a heating plate with a concave upper surface and a convex lower surface is disposed, the process comprising the steps of:

(1) providing power to said computer;
(2) connecting said computer to said fusing apparatus;
(3) providing said computer with software capable of processing parameters for fusing polyolefin pipe with input data related to characteristics of said stack pipe and said main pipe;
(4) connecting pneumatic air lines to said fusing apparatus;
(5) installing said stack pipe in said fusing apparatus;
(6) positioning said stack pipe perpendicular to a section of said main pipe;
(7) clamping said base onto said main pipe;
(8) performing steps of a set-up sequence, including determining
 (a) distance from an upper surface of said heating plate in its lowered position to an uppermost portion of said heating plate in a fully raised position;
 (b) thickness of said heating plate;
 (c) length of said stack pipe;
 (d) distance the stack pipe will migrate into the main pipe; and
 (e) setting said travel head in a position which accounts for the measurements in (a) through (d) in order to maintain proper pressure and clearances during each cycle of the process;
(9) heating said heating plate;
(10) lowering the heating plate onto said main pipe;
(11) pneumatically applying pressure onto said upper surface of said heating plate in order to seat said heating plate;
(12) raising said stack pipe;
(13) pneumatically applying pressure onto said upper surface of said heating plate for a time period sufficient to cause a heated portion of said main pipe to conform to said convex lower surface of said heating plate;
(14) exhausting pressure from said fusing apparatus;
(15) continuing to heat said heating plate;
(16) raising said heating plate from between said lower end of said stack pipe and said heated portion of said main pipe;
(17) pneumatically lowering said lower end of said stack pipe onto said heated portion of said main pipe, under pressure, resulting in a fusion of said pipes;
(18) allowing said fusion to cool;
(19) testing said fusion for its ability to withstand pressure.

2. A process according to claim 1 wherein step (8) is performed automatically.

3. A process according to claim 1 wherein the lower end of the stack pipe is pneumatically lowered onto the upper concave surface of said heating plate, thereby pneumatically applying pressure in steps (11) and (13), and, in step (13), causing a lower end of said stack pipe to conform to said concave upper surface.

4. A process according to claim 1 wherein step (19) is performed automatically before the fusing apparatus is removed from the host pipe.

5. A process according to claim 1 wherein steps (10), (12), and (16) occur pneumatically.

6. A process according to claim (1) wherein steps (11) and (12) may be repeated.

7. An improved fusing apparatus of the type in which a base clamps onto a polyolefin main pipe, rods extend from said base to a movable travel head with holding means for a polyolefin stack pipe, and a heating plate is hinged to said base, wherein the improvement comprises:

(1) pneumatic means for clamping said base onto said main pipe, raising and lowering said travel head, raising and lowering said heating plate, providing pressure to seat said heating plate onto the main pipe, and providing pressure to fuse said stack pipe to a portion of said main pipe.

(2) a computer for controlling and monitoring the sequence of pneumatically-actuated movements of said fusing apparatus according to programmed parameters.

\* \* \* \* \*